(12) United States Patent
Basturk et al.

(10) Patent No.: US 12,504,553 B2
(45) Date of Patent: Dec. 23, 2025

(54) METHOD AND DEVICE FOR DETECTING EARTHQUAKES

(71) Applicant: SAGEMCOM ENERGY & TELECOM SAS, Bois-Colombes (FR)

(72) Inventors: Ahmet Samed Basturk, Bois-Colombes (FR); Abbas Sabraoui, Bois-Colombes (FR); Oussama Abid, Bois-Colombes (FR)

(73) Assignee: SAGEMCOM ENERGY & TELECOM SAS, Bois-Colombes (FR)

( * ) Notice: Subject to any disclaimer, the term of this patent is extended or adjusted under 35 U.S.C. 154(b) by 0 days.

(21) Appl. No.: 18/983,129

(22) Filed: Dec. 16, 2024

(65) Prior Publication Data
US 2025/0208308 A1    Jun. 26, 2025

(51) Int. Cl.
*G01V 1/01*    (2024.01)
*G01V 1/30*    (2006.01)

(52) U.S. Cl.
CPC .......... *G01V 1/01* (2024.01); *G01V 1/30* (2013.01); *G01V 2210/1232* (2013.01); *G01V 2210/324* (2013.01)

(58) Field of Classification Search
CPC ..... G01V 1/01; G01V 2210/1232; G01V 1/30
See application file for complete search history.

(56) References Cited

U.S. PATENT DOCUMENTS

| | | | |
|---|---|---|---|
| 10,520,103 B1 * | 12/2019 | Fatehi | F16K 17/36 |
| 10,876,277 B1 | 12/2020 | Fatehi et al. | |
| 11,354,998 B2 * | 6/2022 | Sellathamby | G01V 1/288 |
| 11,543,547 B2 * | 1/2023 | Kim | G06N 3/047 |
| 2013/0328688 A1 | 12/2013 | Price et al. | |
| 2021/0124070 A1 | 4/2021 | Mino et al. | |
| 2021/0356612 A1 | 11/2021 | Kendall et al. | |

FOREIGN PATENT DOCUMENTS

| CN | 108469632 A | * | 8/2018 | ............... G01V 1/16 |
|---|---|---|---|---|
| KR | 20220067588 A | | 5/2022 | |

OTHER PUBLICATIONS

Translation of CN-108469632-A (Year: 2018).*
(Continued)

*Primary Examiner* — Elias Desta
(74) *Attorney, Agent, or Firm* — Conley Rose, P.C.

(57) ABSTRACT

A method of detecting an earthquake is described, comprising receiving a signal representative of measurements of three-dimensional acceleration of the device as a function of time; frequency filtering of the signal; determining, from the filtered signal, data representative of acceleration directions as a function of time; an earthquake being detected if a) the magnitude of the acceleration is greater than a first threshold and the directions of the acceleration are substantially collinear with one another for a first time interval; or b) the directions of acceleration are substantially collinear with one another during a second time interval, and the directions of acceleration are substantially collinear with one another during a third time interval subsequent to the second time interval, and the directions of acceleration of the second interval and the third interval are substantially orthogonal.

13 Claims, 7 Drawing Sheets

(56) References Cited

OTHER PUBLICATIONS

Foreign Communication from a Related Counterpart Application, French Search Report and Written Opinion dated Jun. 17, 2024, French Application No. 2314781 filed on Dec. 21, 2023.
Sokolov, Vladmir, Three techniques for estimation of Instrumental Intensity: a comparison, The 2013 World Congress on Advances in Structural Engineering and Mechanics (ASEM13), Jeju, Korea, Sep. 8-12, 2013.

* cited by examiner

METHOD AND DEVICE FOR DETECTING EARTHQUAKES

CROSS-REFERENCE TO RELATED APPLICATIONS

The present application claims priority to French Application No. 2314781 filed with the French National Institute of Industrial Property (INPI) on Dec. 21, 2023, and entitled "METHOD AND DEVICE FOR DETECTING EARTHQUAKES," which is incorporated herein by reference in their entirety for all purposes.

TECHNICAL FIELD

An earthquake detection method and device are described. In particular, the method and device can be used to trigger alerts and security actions, for example to secure a resource distribution system.

TECHNICAL BACKGROUND

Some earthquake detection systems use vibration sensors or acoustic pressure sensors. Such systems can be costly and difficult to install. Such systems can also implement trained predictive models (machine learning), but require computing resources that can be substantial. Such resources are not available in certain contexts of use.

It is therefore desirable to have a method for detecting earthquakes that is economical in terms of computing resources.

SUMMARY

One or more embodiments relate to an earthquake detection method implemented by a device including at least one processor and a memory including software code, the at least one processor causing the device to implement the method when it executes the software code, the method comprising:
receiving a signal representative of measurements of a three-dimensional acceleration of the ground device as a function of time, the signal being received from an accelerometer sensor;
frequency filtering of the signal, the filtering being configured with a low cut-off frequency and a high cut-off frequency to exclude at least frequencies not corresponding to seismic wave frequencies;
determining, from the filtered signal, data representative of acceleration directions as a function of time;
an earthquake being detected if
a) the magnitude of the acceleration is greater than a first threshold and the directions of the acceleration are substantially collinear with one another for a first time interval; or
b) the directions of acceleration are substantially collinear with one another during a second time interval, and the directions of acceleration are substantially collinear with one another during a third time interval subsequent to the second time interval, and the directions of acceleration of the second interval and the third interval are substantially orthogonal.

The method uses data from a three-dimensional accelerometer. Such a sensor can be simply integrated into or connected to a device with relatively modest computing resources for processing the sensor data. Such a device may, for example, be a resource-counter device that may need to be secured.

The invention therefore makes it possible to offer a local earthquake detection device at low cost. Local detection makes it possible to act accordingly to trigger safety actions, even when the device is not connected to a communication network, or when this communication network is faulty.

In one or more embodiments, the cut-off frequencies are adapted to exclude frequencies corresponding to noise from the device environment.

According to one or more embodiments, determining data representative of acceleration directions as a function of time is performed only if an acceleration magnitude exceeds a second threshold before signal filtering and exceeds a third threshold after signal filtering.

According to one or more embodiments, the second and third thresholds are adapted to be above acceleration magnitudes corresponding to noise from the device environment.

According to one or more embodiments, the method comprises adapting the cut-off frequencies, respectively adapting the second threshold and the third threshold, as a function of labeled historical acceleration data at a device operating location.

The method includes calibration of certain thresholds to take account of ambient noise and thus avoid or at least limit unwanted triggers, such as false positives or false negatives. Advantageously, this calibration is carried out using labeled historical data.

According to one or more exemplary embodiments, determining the collinearity of acceleration directions is carried out, comprising: determining a hyperplane with respect to N consecutive measurement points from the signal and determining a direction normal to this plane, with $N>1$;
iterating the previous step on M sets of N points of a given time interval, with $M>1$;
concluding that there substantially is collinearity over the time interval under consideration if the angles of the N normal directions taken in pairs are within two ranges comprising 0° and 180°, respectively.

According to one or more exemplary embodiments, determining the orthogonality of acceleration directions is carried out, comprising:
determining a hyperplane with respect to N consecutive measurement points from the signal and determining a direction normal to this plane, with $N>1$;
iterating the previous step on two sets of N points in a given time interval;
concluding that there substantially is orthogonality if the angle between the normal directions of the two hyperplanes determined in the previous step are within two ranges comprising 90° and 270°, respectively.

According to one or more exemplary embodiments, the method comprises, in response to the detection of an earthquake, generating a control signal for equipment securing a resource metered by the device.

According to one or more exemplary embodiments, the method comprises, in response to the detection of an earthquake, generating an alert message to a server.

According to one or more exemplary embodiments, an earthquake is only detected in case b) if the magnitude of the acceleration exceeds a fourth threshold, which is lower than the first threshold.

One or more embodiments relate to an earthquake device comprising a memory having a software code and processor, the processor being adapted, when executing the code, to cause the device to implement at least one of the above methods.

According to one or more embodiments, the device comprises a three-dimensional accelerometer.

One or more embodiments relate to a non-transitory computer-readable storage medium having instructions which, when executed by at least one processor, cause one of the methods described by said at least one processor to be executed.

BRIEF DESCRIPTION OF THE FIGURES

Further features and advantages will become apparent from the following detailed description, which may be understood with reference to the attached drawings in which.

DETAILED DESCRIPTION

In the following description, identical, similar or analogous elements will be referred to by the same reference numbers. The block diagrams, flowcharts and message sequence diagrams in the figures shows the architecture, functionalities and operation of systems, apparatuses, methods and computer program products according to one or more exemplary embodiments. Each block of a block diagram or each step of a flowchart may represent a module or a portion of software code comprising instructions for implementing one or more functions. According to certain implementations, the order of the blocks or the steps may be changed, or else the corresponding functions may be implemented in parallel. The method blocks or steps may be implemented using circuits, software or a combination of circuits and software, in a centralized or distributed manner, for all or part of the blocks or steps. The described systems, devices, processes and methods may be modified or subjected to additions and/or deletions while remaining within the scope of the present disclosure. For example, the components of a device or system may be integrated or separated. Likewise, the features disclosed may be implemented using more or fewer components or steps, or even with other components or by means of other steps. Any suitable data-processing system can be used for the implementation. An appropriate data-processing system or device comprises for example a combination of software code and circuits, such as a processor, controller or other circuit suitable for executing the software code. When the software code is executed, the processor or controller prompts the system or apparatus to implement all or part of the functionalities of the blocks and/or steps of the processes or methods according to the exemplary embodiments. The software code can be stored in non-volatile memory or on a non-volatile storage medium (USB key, memory card or other medium) that can be read directly or via a suitable interface by the processor or controller.

The present description relates to an earthquake detection device. The context of the specific examples is a resource meter, and the implementation of safety measures in the event of earthquake detection. This context is given for illustrative purposes only and should not be construed as limiting the invention to this context alone. Metered resources include fluids (gas, water, fuel, etc.) or electrical energy. More generally, earthquake detection is of interest for any meter whose resource may be lost, or which may cause damage as a result of an earthquake.

Figure 1:
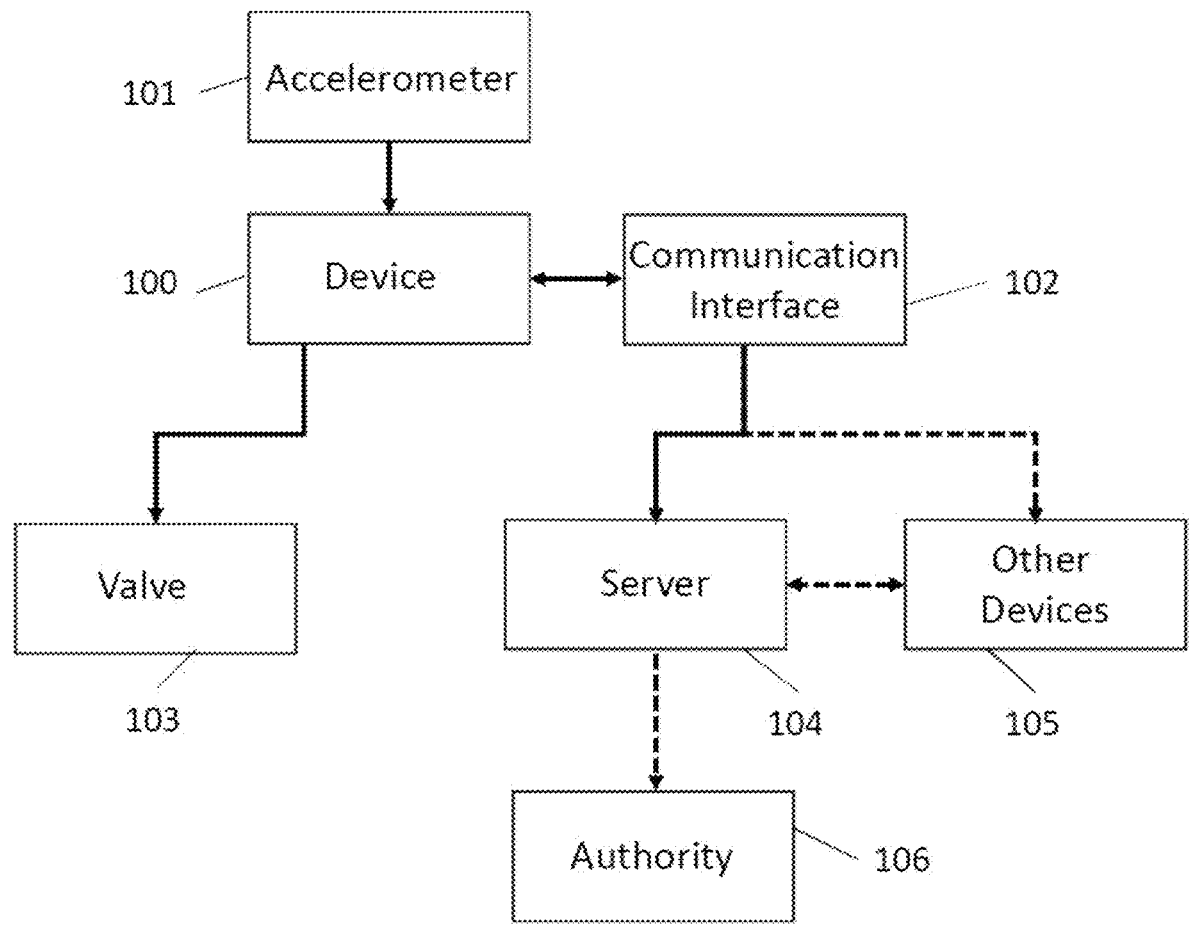
FIG. 1 is a schematic diagram of a system comprising a device according to one or more embodiments.

FIG. 1 is a schematic diagram of a system comprising a device 100 according to one or more embodiments; Device 100 is, for example, a resource meter. Device 100 receives data from a three-dimensional accelerometer 101. This sensor can also be an integral part of the device 100. The device 100 also includes a processor and non-volatile memory containing software code for implementing the earthquake detection method.

Optionally, the meter can also have a control interface configured to trigger a safety action, such as closing a valve 103.

Optionally, a communication interface 102 connected to the device 100 is configured to enable communication between the device 100 and a third party, such as the server 104. The communication interface 102 can be a wireless interface, such as cellular, or an interface to a wired network, such as a conventional telephone network. Device 100 is adapted to inform server 104 of the detection of an earthquake. The server 104 can then trigger an action, such as informing a competent authority 106, and/or informing other devices 105, similar to the device 100, so that the latter can initiate safety actions in turn.

Optionally, device 100 is configured to transmit an earthquake alert directly to one or more other devices 105 so that the latter can, if necessary, initiate safety actions in turn. According to a variant embodiment, transmission is via the server 104, that is, an alert is sent by the device 100 to the server 104, which transmits it to one or more devices 105, such as devices 105 in the vicinity of the device 100 and therefore also exposed to the risks of the earthquake.

The transmission of an alert by the device 100 to devices 105 and/or the triggering of an action by a device 105 may be subject to a criterion of geographical proximity between the device 100 and the device or devices 105.

Optionally, server 104 is in communication with a plurality of devices 105 of the type of device 100 and can receive earthquake alerts from several devices 100. This makes it possible to adapt the strategy for triggering an action—for example, it is possible to trigger an action only if several devices 100 have detected an earthquake.

In the context of a device 100 with metering functionality, the device 100 may need to communicate consumption data for the resource it is metering at regular intervals or on demand. This transmission takes place at daily intervals, for example, and can be triggered by a request from the server. In the case of an earthquake detection, the device 100 is, according to a particular embodiment, configured to force the transmission of a message, freeing itself from the constraints linked to the transmission of metering data.

Some of the physics involved in an earthquake will now be described. During an earthquake, there are different types of seismic waves, defined by their propagation speed, amplitude and polarization. The main wave types are as follows:

"P" (for "Primary") waves—these waves propagate rapidly and are the first to be felt;

"S" (for "Secondary") waves—these waves generally arrive after the P-waves;

Table 2 shows an earthquake intensity scale, and for each level of the scale: acceleration, velocity, felt tremor, potential damage and effect on certain resources. The table shows (a) that an earthquake can be felt from an acceleration amplitude of around 3 mg (2.97 mg in the table) and (b) that damage appears from an acceleration amplitude of around 27 mg.

TABLE 2

| Measured intensity | Acceleration (g) | Speed (cm/s) | Felt tremor | Potential damage | Resources |
|---|---|---|---|---|---|
| I | <0.000464 | <0.0215 | Not felt | None | |
| II-III | 0.000464-0.00297 | 0.135-1.41 | Low | None | |
| IV | 0.00297-0.00276 | 1.41-4.65 | Light | None | |
| V | 0.0276-0.115 | 4.65-9.64 | Moderate | Very light | Tripping of automatic valves for domestic gas. Interruption of some water lines. Power cuts. |
| VI | 0.115-0.215 | 9.64-20 | Strong | Light | Damaged water and gas lines. Interruption of gas and water supplies in some regions. |
| VIII | 0.215-0.401 | 20-41.4 | Very strong | Moderate | Same as previous line. |
| VIII | 0.401-0.747 | 41.4-85.8 | Severe | Moderate to significant | Damaged water and gas lines. Interruption of gas, water and electricity supply. |
| IX | 0.747-1.39 | 85.8-178 | Violent | Significant | |
| X | >1.39 | >178 | Extreme | Very significant | |

Shear waves—these generally arrive after the two preceding waves and are the most destructive.

Table 1 summarizes the main types of waves generated during an earthquake.

TABLE 1

| Waves | P | S | Love | Rayleigh |
|---|---|---|---|---|
| Wave type | Compression | Shear | Shear | Shear |
| Speed (km/s) | ~5.6 | ~3.2 | ~3 | ~3 |
| Damage | Low | Moderate | High | High |
| Polarization | Horizontal | Vertical | Horizontal | Rotational |

Table 1 shows that the later the waves are, the more destructive they tend to be. Safety actions and/or alerts must therefore be triggered as soon as possible. Early detection is therefore preferable.

Figure 2:
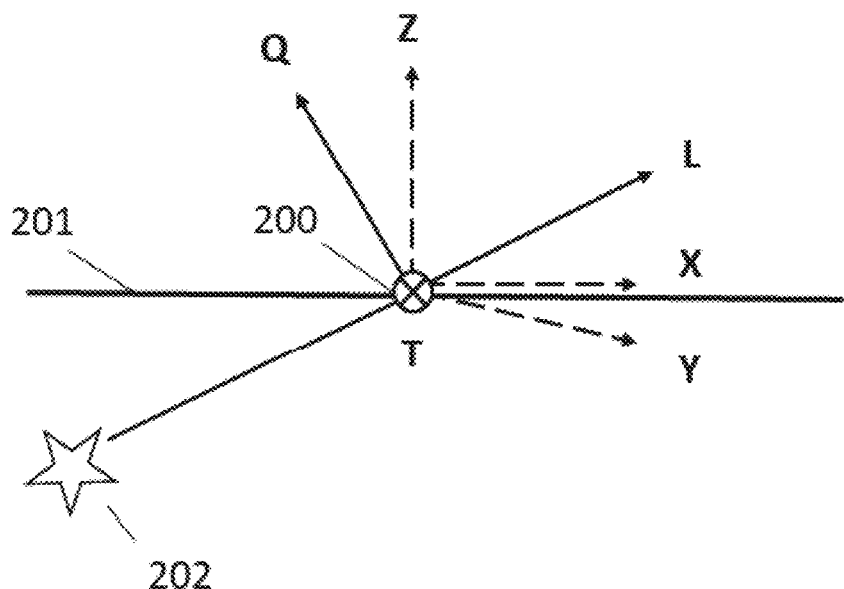
FIG. 2 is a schematic diagram showing an XYZ coordinate system for an acceleration sensor 200 and a QLT coordinate system for seismic waves.

FIG. 2 is a schematic diagram showing an XYZ coordinate system for an acceleration sensor 200 and a QLT coordinate system for seismic waves. An orthogonal coordinate system linked to the device has two axes X and Y in the plane of surface 201 (assumed to be flat) and an axis Z vertical to this surface. The direction of propagation of seismic waves from source 202 to sensor 200 is indicated by L and the direction orthogonal to the direction of propagation and in the plane including this direction L, source 202 and sensor 200 through Q. A T axis is perpendicular to the L and Q axes. In the example shown, P-waves generate accelerations along the X and Z axes, while S-waves generate accelerations along the X and Y axes.

According to one or more embodiments, it is desired to detect an earthquake:

i. at a time between the arrival of P-waves and before the arrival of surface waves (Love and Rayleigh waves), and/or ii. at the transition from P- to S-waves.

It is proposed to use a three-dimensional accelerometer to capture earthquake waves. The signals from the accelerometer are then used to detect the earthquake.

Concerning the first point, i, above, verification of the magnitude of the acceleration is carried out. If the magnitude exceeds a threshold, an earthquake is detected.

Concerning the second point, ii, above, since P-waves and S-waves are orthogonal, the transition from P-waves to S-waves can be detected by performing a directional analysis and testing the orthogonality of the acceleration axes over time.

Note that the displacements generated by P-waves are collinear with one another, and that the displacements generated by S-waves are collinear with one another.

It should be noted that an earthquake can be detected according to the second case without necessarily being detected first according to the first case. This can happen, for example, when the P-waves detected do not meet the detection criteria of the first case.

Moreover, seismic waves generally have a frequency between 0 and 50 Hz. Propagation speed generally increases with frequency. According to some embodiments, a low-pass frequency filter is applied to limit the bandwidth to frequency components corresponding to seismic waves.

According to some embodiments, a bandpass frequency filter is applied to limit the bandwidth to useful components. The low and/or high cut-off frequencies of this filter are adjusted during a calibration phase described later to reduce the impact of ambient noise on earthquake detection.

According to embodiments, the low-pass and bandpass filters are combined into a single filter, that is, the high frequency of this combined filter substantially filters frequencies above 50 Hz, but can be adjusted for a high cut-off frequency lower than 50 Hz.

According to one or more exemplary embodiments, a calibration is carried out at the installation site in order to distinguish ambient noise from signals due to an earthquake. Ambient noise includes, for example, noise generated by an elevator, by traffic (road, rail, air), by various appliances and machines, etc. Calibration is carried out, for example, on the basis of a week's worth of measurements, in order to adjust the parameters implemented in the method, and in particular one or more thresholds. Ambient noise is filtered to limit both false positives and false negatives. According to some embodiments, the adjustable parameters comprise at least one of: the low cut-off frequency of the bandpass filter, the high cut-off frequency of the bandpass filter, an acceleration magnitude threshold SA for initial triggering of earthquake detection on the basis of the accelerometer signal, and an acceleration magnitude threshold SB applied after filtering of the accelerometer signal.

Figure 3:
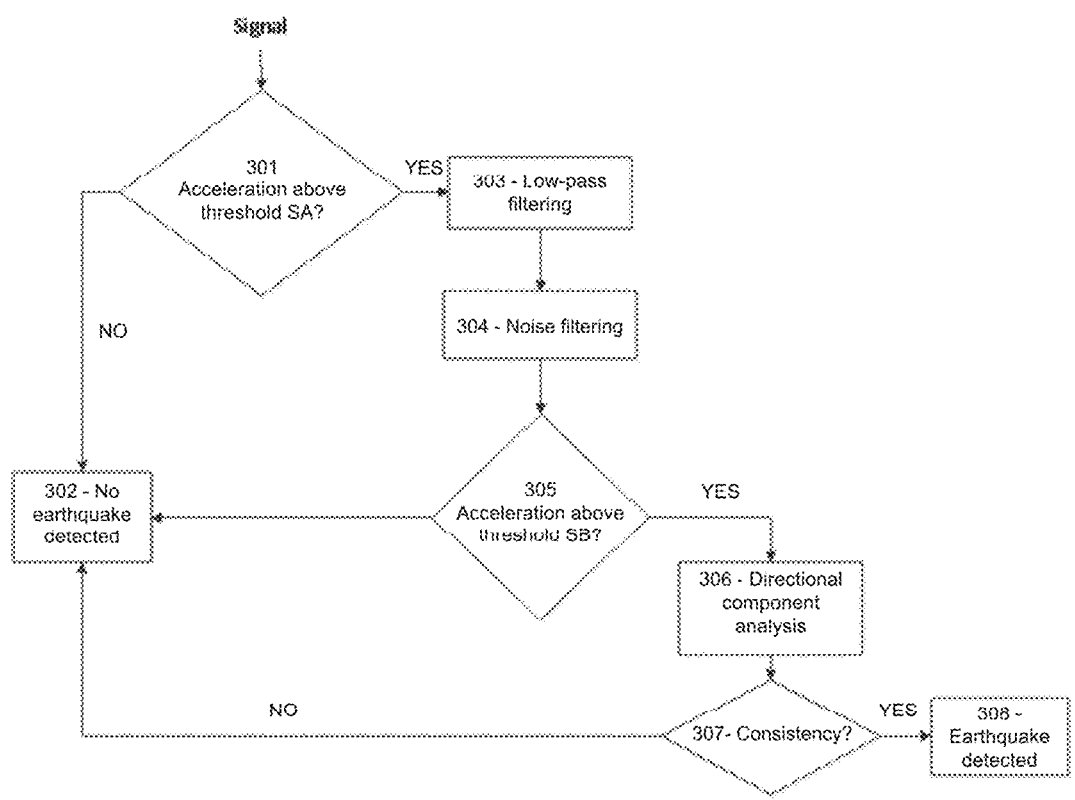
FIG. 3 is a flowchart of a method according to one or more exemplary embodiments.

FIG. 3 is a flowchart of an earthquake detection method according to one or more non-limiting embodiments. The accelerometer signal is received as input. It is verified at 301 if the magnitude of the acceleration exceeds the initial trigger threshold SA. This trigger threshold is chosen to avoid unnecessary calculations and/or limit false positives. If the trigger threshold SA is not exceeded, then no further signal processing is undertaken-which saves signal processing resources—and no earthquake is detected (302). If the initial trigger threshold SA is exceeded, then the signal from the accelerometer is subjected to low-pass frequency filtering 303, limiting the bandwidth to that of waves generated during an earthquake. The implementation of the threshold SA is optional, however, and it is perfectly possible to go straight to signal filtering. At 304, additional filtering is applied to the signal, with the aim of eliminating or at least limiting the influence of ambient noise. At 305, the magnitude of the acceleration, after filtering, is compared to a threshold SB. If the threshold SB is not exceeded, then no earthquake is detected (302). If the threshold SB is exceeded, an analysis of the directional components of the acceleration is carried out at 306. Depending on the results of this analysis, verified at 307, either no earthquake is detected (302), or an earthquake is detected (308).

According to some embodiments, in the event of an earthquake being detected, safety actions triggered by the detection may include the actuation of a resource cut-off element associated with the meter (valve, disconnector, etc.).

According to some embodiments, if an earthquake is detected, an alert is sent to a distributor or supplier of the resource and/or to a competent authority.

Figure 4:
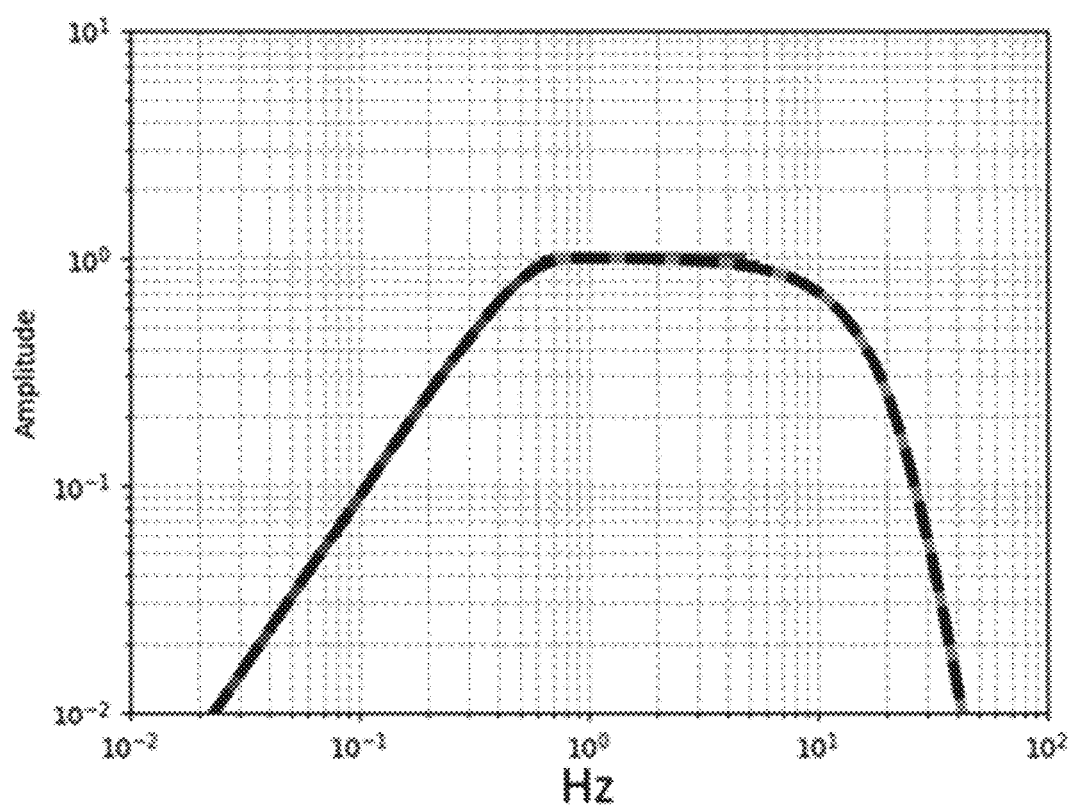
FIG. 4 is a graph showing an example of a bandpass filter according to one embodiment.

FIG. 4 is a graph showing an example of a bandpass filter resulting from the combination of a low-pass filter and a high-pass filter and performing the filtering at 303 and 304. The high-pass and low-pass filters can be carried out digitally on the basis of equations 1 and 2, respectively:

[Math. 1]

$$\sqrt{1-\left(e^{-3\frac{f}{f_0}}\right)}$$

[Math. 2]

$$\frac{1}{\sqrt{\sum_0^6 a_{2\times i} \times x^{2\times i}}}$$

f0 is the cutoff frequency of the high-pass filter, f1 is the cutoff frequency of the low-pass filter and f is the frequency.

Table 3 gives examples of values for the various parameters:

TABLE 3

| | |
|---|---|
| x | =f/f1 |
| f1 | =10 |
| f0 | =0.5 |
| a0 | =1 |
| A2 | =0.694 |
| a4 | =0.241 |
| a6 | =0.0557 |
| a8 | =0.009664 |
| a10 | =0.00134 |
| a12 | =0.000155 |

One or more parameters are calibrated to limit the impact of ambient noise on earthquake detection. Ambient noise may include environmental noise and/or noise generated by the resource itself (e.g., liquid-generated noise).

Figure 5:
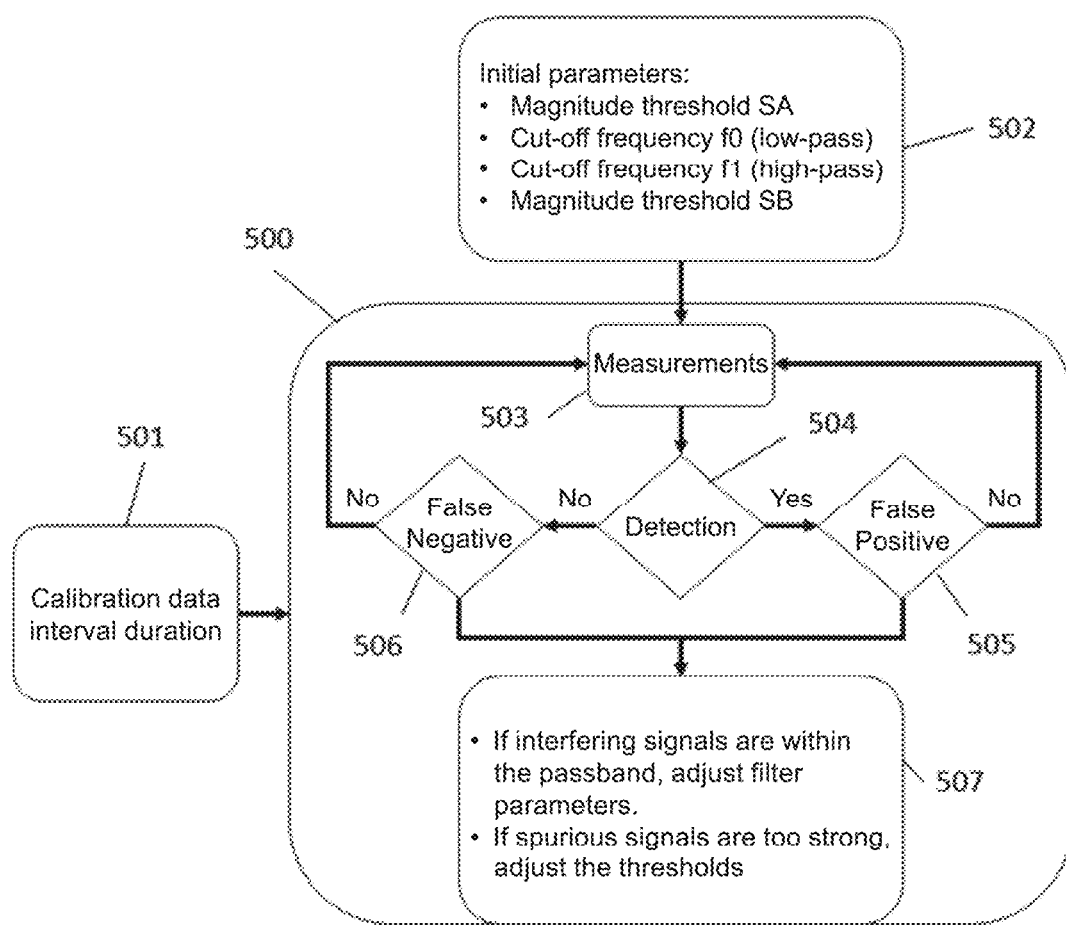
FIG. 5 is a flowchart of a calibration method according to an exemplary embodiment.

FIG. 5 is a flowchart of a calibration method according to an exemplary embodiment. This flowchart adjusts several parameters. Note that it is entirely possible, depending on the implementation, to adjust only some of these parameters.

The calibration method 500 shown in FIG. 5 receives as input a duration 501 of the calibration data interval. This duration can be fixed or adjustable. For example, a one-week period to cover a variety of events on workdays and weekends. The method also receives as input initial values 502 for thresholds SA and SB and cut-off frequencies f0 (low-pass) and f1 (high-pass).

Measurements 503 are then obtained over the specified time and an earthquake detection is then performed at 504 on the basis of these measurements. False positives 505 and false negatives 506 are then manually labeled. Parameters are adjusted on this basis at 507. If, for example, noises fall within the filter's frequency band, then the cut-off frequencies can be adjusted to exclude the frequencies of these noises. If noise levels are too high in relation to the thresholds, the thresholds are raised.

Analysis of the acceleration vector components is designed to characterize the presence of P-waves or the transition from P-waves to S-waves. This analysis is based on the fact that movements generated by one type of wave are collinear with one another, and displacements between P- and S-waves are orthogonal. The presence of seismic waves can therefore be determined by estimating the collinearity of movements represented by successive measurement points, where a point is a measurement of acceleration in three dimensions. If collinearity is confirmed over a certain period of time, then this may indicate the presence of a wave. In addition, the orthogonality of movements between two series of collinear points can indicate the transition from P-waves to S-waves.

Figure 6:
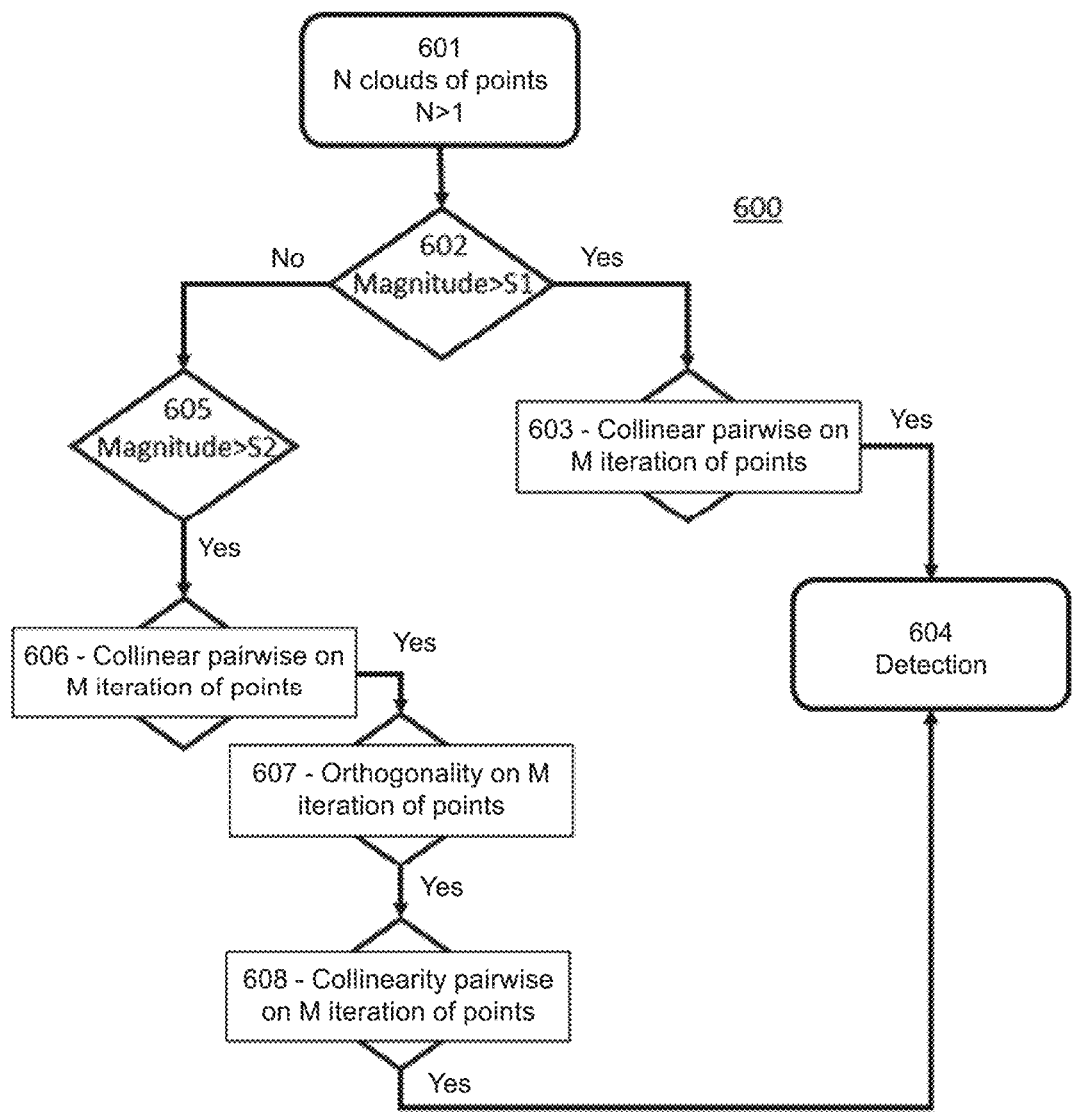
FIG. 6 is a flowchart of a vector component analysis method 600 according to a particular exemplary embodiment.

FIG. 6 is a flowchart of a vector component analysis method 600 according to a particular exemplary embodiment. The method in FIG. 6 receives as input (at 601) a cloud N of measurement points, with N>1. According to one embodiment, N can be parameterized based on the desired sensitivity, computing capabilities and accelerometer performance. A cloud comprises a plurality of measurement points, the number of which can be variable based on the sampling frequency. For example, consider a sampling frequency of around 100 Hz, between 3 and 100 points per cloud, and up to 50 clouds. These values are given by way of illustration, and other values may of course be considered.

First, at 602, an acceleration magnitude determined for a cloud is compared with a first threshold S1. This magnitude corresponds—for example—to the median of the points in the cloud, but other ways of calculating this magnitude can be envisaged. The threshold S1 is—for example—between 10 mg and 100 mg. If the threshold S1 is reached or exceeded, then an estimation of the collinearity of movements corresponding to two successive clouds is performed on M clouds, at 603. M is taken to be greater than or equal to 2. If the movements are collinear on the M clouds, then an earthquake is detected (604). This corresponds to case 'i' mentioned above—P-type waves, with a relatively high acceleration magnitude exceeding threshold S1. However, the detected P-wave magnitude may be below threshold S1. In this case, P-type waves go unnoticed. However, we then test at 605 whether the magnitude is greater than a threshold S2, with S2<S1. If this is the case, then we test for collinearity at 606, the presence of orthogonality at 607, followed by collinearity at 608. Each of these three tests can be performed on M successive clouds, but the number of clouds can be different for each of the three tests.

By way of illustration, S1 and S2 have values of 20 mg and 10 mg, respectively.

In one embodiment, clouds of successive points over time are considered. A hyperplane is associated with each cloud of points. Each plane is associated with a direction of movement. A collinearity and/or orthogonality criterion is evaluated for the directions of successive hyperplanes.

Figure 7:
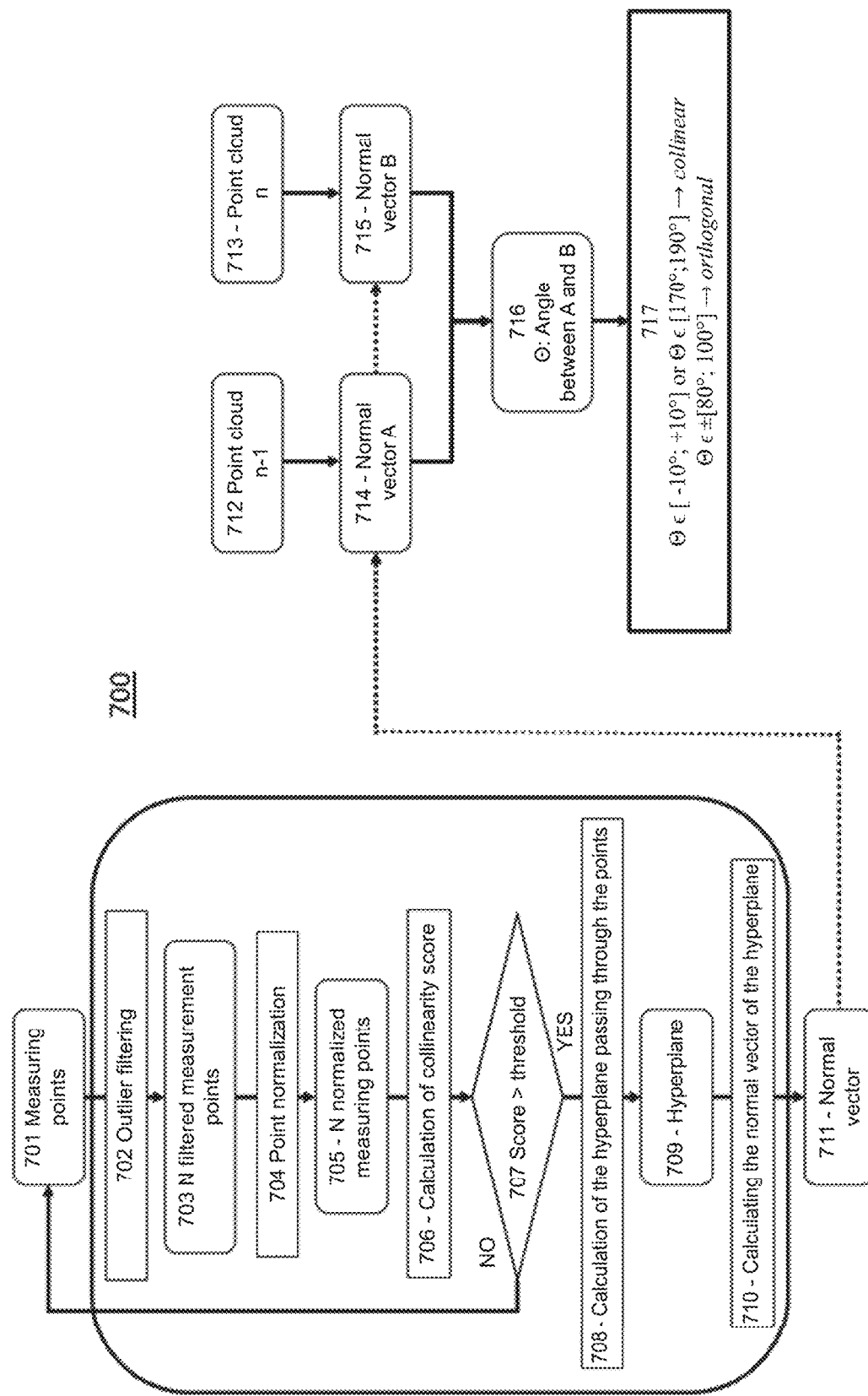
FIG. 7 is a non-limiting example of a method for determining collinearity and orthogonality.

FIG. 7 is a non-limiting example of a method 700 for determining collinearity and orthogonality.

The method receives as input at 701 the three-dimensional measurement points of one of the clouds. Outlier filtering can then be carried out using a method known per se for limiting noisy measurements, at 702. Filtered measurement points are thus obtained at 703. The points are then normalized at 704. Based on these normalized points (705), a collinearity score is established at 706. This score can, for example, be based on a covariance calculation. If this score is below a collinearity threshold, then the points in the cloud are judged not to be collinear, and we move on to another point cloud. This test was carried out at 707. If the collinearity score is greater than or equal to the threshold, then the hyperplane relative to the cloud points is determined at 708, for example on the basis of a polynomial function by which a plane minimizing the distance between the cloud points and this plane is determined. The resulting hyperplane (709) is used to determine at 710 a normal vector to this hyperplane.

A normal vector is determined by cloud. For example, for two consecutive clouds n−1 and n (referenced 712 and 713 in FIG. 7), two normal vectors A and B (referenced 714 and 715) are obtained. An angle Θ between the two normal vectors is determined (716). Depending on the value of Θ, the collinearity of the two vectors or their orthogonality is determined. The two vectors can also be neither collinear nor orthogonal. According to the present embodiment, the two vectors are considered collinear if Θ is between −10° and +10° or between 170° and 190, and orthogonal if Θ is between −80° and −100 or between +80° and +100°.

These thresholds can optionally be adjusted, for example to take account of accelerometer dispersion.

Figure 8:
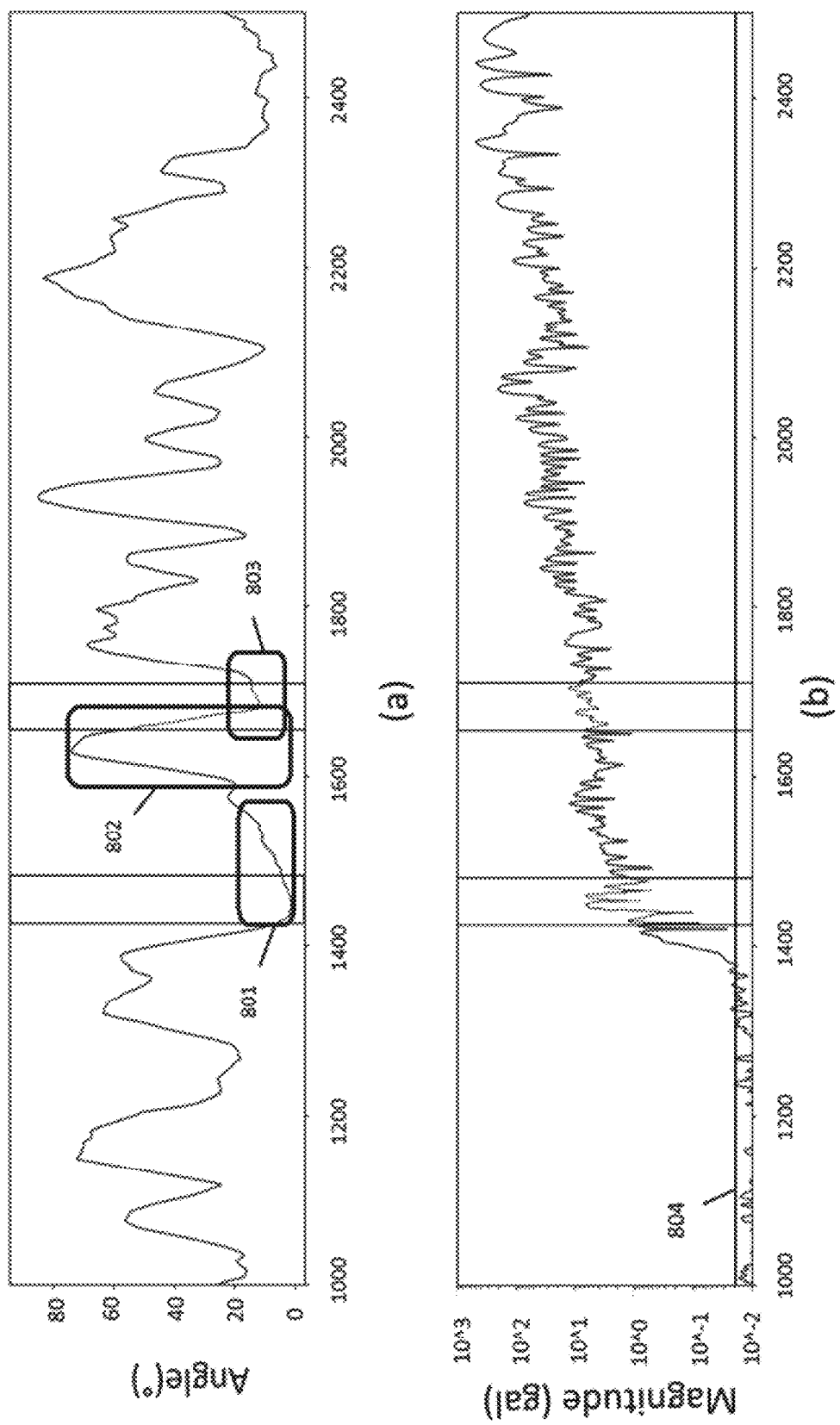
FIG. 8 comprises two graphs (a) and (b) respectively representing the evolution of an angle used in the evaluation of the collinearity or orthogonality of displacements due to an earthquake as a function of time, and showing the application of the method according to one or more exemplary embodiments and the magnitude of the acceleration.

FIG. 8 shows two examples of graphs illustrating the application of the method according to one or more embodiments. The upper graph (a) in FIG. 8 represents the angle θ between successive point clouds in degrees as a function of time, while the lower graph (b) represents the magnitude of accelerations in g represented in logarithmic scale as a function of time. The unit of time is a 10th of a second. Graph (a) shows the first part 801 of the curve, representing an angle value of less than 10 degrees over a relatively long time interval. This part corresponds to a zone of collinearity. A second part 802 of the curve, following the first part, shows a strong peak in the angle, corresponding to orthogonality, followed by a third part 803, where the angle returns to a value of around 10° for a certain time interval, corresponding to a second zone of collinearity. Note that the graph in FIG. 8 is smoothed, so the 80° threshold value previously indicated does not appear to have been reached in this graph. The first collinearity zone corresponds to P-type waves, while the second collinearity zone corresponds to S-type waves, as it is preceded by a zone indicating orthogonality between the movements between the first and second collinearity zones, respectively. Graph (b) shows a horizontal line 804 corresponding to an acceleration magnitude of 20 mg. We can see that the first zone of collinearity, corresponding to P-type waves, coincides with a significant increase in acceleration magnitude.

The invention claimed is:

1. An earthquake detection method implemented by a device including at least one processor and a memory including software code, the at least one processor causing the device to implement the method when it executes the software code, the method comprising:
receiving a signal representative of measurements of a three-dimensional acceleration of the device as a function of time, the signal being received from an accelerometer sensor;
frequency filtering of the signal, the filtering being configured with a low cut-off frequency and a high cut-off frequency to exclude at least frequencies not corresponding to seismic wave frequencies;
determining, from the filtered signal, data representative of acceleration directions as a function of time;
an earthquake being detected if
a) the magnitude of the acceleration is greater than a first threshold and the directions of the acceleration are substantially collinear with one another for a first time interval; or
b) the directions of acceleration are substantially collinear with one another during a second time interval and the directions of acceleration are substantially collinear with one another during a third time interval subsequent to the second time interval, and the directions of acceleration of the second interval and the third interval are substantially orthogonal.

2. The method according to claim 1, wherein the cutoff frequencies are adapted to exclude frequencies corresponding to noise from the device environment.

3. The method according to claim 1, wherein determining data representative of directions of acceleration as a function of time is performed only if a magnitude of acceleration exceeds a second threshold before signal filtering and exceeds a third threshold after signal filtering.

4. The method according to claim 3, wherein the second and third thresholds are adapted to be above acceleration magnitudes corresponding to noise from the device environment.

5. The method according to claim 3, comprising adapting the cut-off frequencies, respectively adapting the second threshold and the third threshold, as a function of labeled historical acceleration data at a device operating location.

6. The method according to claim 1, wherein a determination of the collinearity of acceleration directions is carried out, comprising:
- determining a hyperplane with respect to N consecutive measurement points from the signal and determining a direction normal to this plane, with N>1;
- iterating the previous step on M sets of N points of a given time interval, with M>1;
- concluding that there substantially is collinearity over the time interval under consideration if the angles of the N normal directions taken in pairs are within two ranges comprising 0° and 180°, respectively.

7. The method according to claim 1, wherein a determination of the orthogonality of acceleration directions is carried out, comprising:
- determining a hyperplane with respect to N consecutive measurement points from the signal and determining a direction normal to this plane, with N>1;
- iterating the previous step on two sets of N points in a given time interval;
- concluding that there substantially is orthogonality if the angle between the normal directions of the two hyperplanes determined in the previous step are within two ranges comprising 90° and 270°, respectively.

8. The method according to claim 1, comprising, in response to the detection of an earthquake, generating a control signal for equipment securing a resource metered by the device.

9. The method according to claim 1, comprising, in response to the detection of an earthquake, generating an alert message to a server.

10. The method according to claim 1, wherein an earthquake is detected in case b) only if the magnitude of the acceleration exceeds a fourth threshold, lower than the first threshold.

11. An earthquake detection device comprising a memory including software code and the processor, the processor being adapted, when executing the code, to cause the device to implement the method according claim 1.

12. The device according to claim 11, comprising the three-dimensional accelerometer.

13. A non-transitory computer-readable storage medium comprising instructions which, when executed by at least one processor, cause said at least one processor to execute the method of claim 1.

* * * * *